United States Patent

Bebjak et al.

[11] Patent Number: 6,103,164
[45] Date of Patent: Aug. 15, 2000

[54] METHOD FOR MANUFACTURING A SEAL IN A BEARING GROOVE OF A CYLINDER HEAD

[75] Inventors: Stefan Bebjak, Augsburg, Germany; Walter Bach, Weigelsdorf, Austria

[73] Assignee: Firma Druckgusswerk Mössner GmbH, München, Germany

[21] Appl. No.: 08/648,535

[22] Filed: May 15, 1996

[30] Foreign Application Priority Data

Nov. 10, 1995 [DE] Germany ............... 195 42 032

[51] Int. Cl.⁷ .................................. B29C 69/00
[52] U.S. Cl. ............. 264/250; 264/265; 264/267; 425/127
[58] Field of Search .................. 264/265, 267, 264/250; 425/127

[56] References Cited

U.S. PATENT DOCUMENTS

| 3,526,694 | 9/1970 | Lemelson ........................ 264/259 |
| 3,845,183 | 10/1974 | Harrison ......................... 264/250 |
| 4,059,564 | 11/1977 | Coughlan et al. . |
| 4,247,510 | 1/1981 | Desverchere ................... 264/236 |
| 4,819,953 | 4/1989 | Joh . |
| 4,914,146 | 4/1990 | Honda et al. . |

FOREIGN PATENT DOCUMENTS

| 0268200 | 5/1988 | European Pat. Off. . |
| 0416653 | 3/1991 | European Pat. Off. . |
| 0488879 | 6/1992 | European Pat. Off. . |
| 0558033 | 9/1993 | European Pat. Off. . |
| 838528 | 5/1952 | Germany . |
| 1425439 | 1/1969 | Germany . |
| 2203485 | 8/1972 | Germany . |
| 2437567 | 2/1976 | Germany . |
| 2551360 | 5/1977 | Germany . |
| 3018074 | 11/1981 | Germany . |
| 3134825 | 3/1983 | Germany . |
| 3439602 | 5/1986 | Germany . |
| 8705592 | 7/1987 | Germany . |
| 4124730 | 1/1993 | Germany . |
| 4202860 | 8/1993 | Germany . |
| 60-237267 | 11/1985 | Japan . |
| 9520102 | 7/1995 | WIPO . |

*Primary Examiner*—Jan H. Silbaugh
*Assistant Examiner*—Edmund H. Lee
*Attorney, Agent, or Firm*—Robert W. Becker & Associates

[57] ABSTRACT

A method for manufacturing a seal at a cylinder head of a vehicle motor includes providing a bearing groove at a cylinder head of a vehicle motor and providing a mold member for cooperating with the bearing groove to form the seal. The seal material is introduced into the mold member so as to provide a defined excess surpassing the volume of the sealing material required for filling the bearing groove. Curing of the seal material enclosed in the bearing groove and the mold member is achieved under pressure. The pressing device for performing the method includes a mold member with receiving groove for cooperation with the bearing groove of the cylinder groove.

17 Claims, 2 Drawing Sheets

METHOD FOR MANUFACTURING A SEAL IN A BEARING GROOVE OF A CYLINDER HEAD

BACKGROUND OF THE INVENTION

The present invention relates to a method for manufacturing a seal at a shaped body, especially at the cylinder head of a vehicle motor, wherein the cylinder head is a diecast member and has a bearing groove for receiving the seal and wherein the seal is applied under pressure, and also relates to a pressing device for applying a seal to a shaped body, especially a cylinder head of a vehicle motor in which the cylinder head comprises a bearing groove for the seal.

It is known to apply a seal, for example, at a cylinder head comprised of a diecast member of a vehicle motor, by applying with a cartridge gun or any other application device sealing material, for example, silicone elastomer, into the bearing groove of the cylinder head under high pressure in order to anchor the seal as securely as possible within the bearing groove.

From German Offenlegungsschrift 30 18 074 it is known to apply a silicone elastomer seal in one or more layers, to allow the solvent to evaporate at room temperature, and to thus realize the curing of the seal.

The problem with such seals is that for a required manufacturing speed, as it is, for example, necessary in the automobile industry, bubbles will form within the seal which destroy the sealing properties of the seal. Thus, it is known to apply considerable pressures, for example, a pressure of 60 bar. Such a pressure, however, requires not only a correspondingly stable support of the cylinder head gasket which is comprised of formed sheet metal or preferably also comprised of a diecast member. The high pressure pressing device required for application of the seal is also very expensive and complicated especially since the application must be automated. All joints etc. of the application arm must thus withstand the high pressure whereby, however, the precision of the shape may not be neglected.

It is furthermore known to produce the seal as an extruded profile whereby numerous shapes for the design of the seal have become known. For example, such seals are known from German Offenlegungsschrift 24 37 567 and German Offenlegungsschrift 25 51 360. The material to be used is selected such that it is substantially resistant in the presence of oil as well as in the presence of acidic components that are contained within old oil. However, hot and thus low viscosity oils have the tendency to creep under the seals especially when diecast cylinder heads are being used which have, in general, a substantially greater surface roughness than sheet metal covers.

It is therefore an object of the present invention to provide a method for manufacturing a seal at a shaped body as well as a pressing device with which a permanent sealing action even with respect to low viscosity oils and diecast shaped bodies are provided whereby, however, the manufacture should require only little expenditures while, at the same time, the required precision-related specifications and precision should be maintained.

SUMMARY OF THE INVENTION

The inventive method of manufacturing a seal at a shaped body such as a cylinder head of a vehicle motor according to the present invention is primarily characterized by the following steps:

Providing a bearing groove at the cylinder head;

Providing a mold member for cooperating with the bearing groove to form the seal;

Introducing the seal material into the mold member so as to provide a defined excess surpassing the volume of sealing material required for filling the bearing groove;

Curing under pressure the seal material enclosed in the bearing groove and the mold member to form the seal.

Preferably, the step of introducing includes the step of pressing the defined excess, while in a plastically deformable state before the step of curing, into the bearing groove.

Preferably, the step of introducing includes the step of applying pressure of 1.5 to 6 bar on the seal material during introduction.

The pressure is preferably 3 bar.

Advantageously, the step of introducing includes the step of applying the sealing material with a low pressure metering and mixing device and the sealing material is preferably a heat-curable two-component silicone elastomer.

Expediently, the method further includes the step of heating the sealing material before introducing the same into the mold member and/or the step of heating the cylinder head before introducing the cylinder material and/or the step of heating the mold member before introducing the sealing material.

Advantageously, the mold member has a low mass and comprises a receiving groove, wherein the mold member is stiffened in the area of the receiving groove.

Preferably, the method further comprises the step of providing the receiving groove with a non-stick surface layer for facilitating removal of the seal from the mold member.

Preferably, the non-stick surface is made of polytetrafluoroethylene.

Advantageously, the sealing material is solvent-free, especially free of ethyl acetate.

The pressing device according to the present invention for applying a seal to a shaped body such as a cylinder head of a vehicle motor, wherein the shaped body or cylinder head comprises a bearing groove for receiving the seal, is primarily characterized by:

A mold member with receiving groove for receiving the sealing material in an amount providing a defined excess surpassing the volume of sealing material required for filling the bearing groove, wherein the pressing device presses the defined excess into the bearing groove, and wherein the mold member and the bearing groove cooperate for enclosing the sealing material to be cured therein under heat.

Expediently, the mold member is positioned such that the receiving groove faces upwardly and the sealing material is introduced into the receiving groove from above.

Preferably, the pressing device further comprises a heating device for heating cyclically at least one of the cylinder head and the mold member to a preheating temperature and to a curing temperature and further comprising a preheating zone for preheating the cylinder head advanced to the pressing device.

Preferably, the preheating temperature is approximately 60° C. and the curing temperature is approximately 150° C.

Surprisingly, with the inventive solution, the seal introduced into the bearing groove of the shaped body is free of bubbles and also prevents creeping of oil under the seal without requiring high pressure application during curing. By applying the seal first in the receiving groove of the mold member, it is ensured that at the active surface of the seal which later on will rest at the cylinder head or any other counter surface of the shaped body, no bubbles will occur. In general, bubbles will not form during low pressure application at the base or at least they will move in the upward direction, i.e., outside of the area of the active surface of the seal. By pressing the sealing material between the shaped body (e.g., cylinder head) and the mold member, bubbles are removed. In general, however, the formation of bubbles at the base of the bearing groove would be essentially uncritical since they would be completely surrounded by sealing material.

Apparently, the sealing material during pressing between the mold member and the shaped body experiences an intensive binding with the surrounding material, i.e., especially with the diecast member so that creeping of oil between seal and groove is securely prevented.

In contrast to the high pressure method for applying the seal directly in situ into the bearing groove, the inventive method has the advantage that considerably reduced pressure can be applied. Surprisingly, an especially high pressure is not required for pressing the mold member onto the shaped body. However, it is understood that for the curing step suitable conditions must be realized.

In this context, within a special embodiment, it is suggested to heat cure the seal, especially at a temperature of approximately 150° C. The defined excess, which fills the bearing groove and provides additional material relative to the size of the bearing groove, provides for a sufficient safety margin for the complete filling of the bearing groove whereby it is understood that during curing non-shrinking material is preferred.

Especially preferred is a heat-resistant, two-component silicone elastomer which provides the required mechanical properties and also an excellent recovery behavior.

It is especially advantageous that with the inventive solution a shaped body such as a diecast member including the seal can be premanufactured and, for example, supplied to the motor manufacturer in a premanufactured state.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 4.

Figure 1:
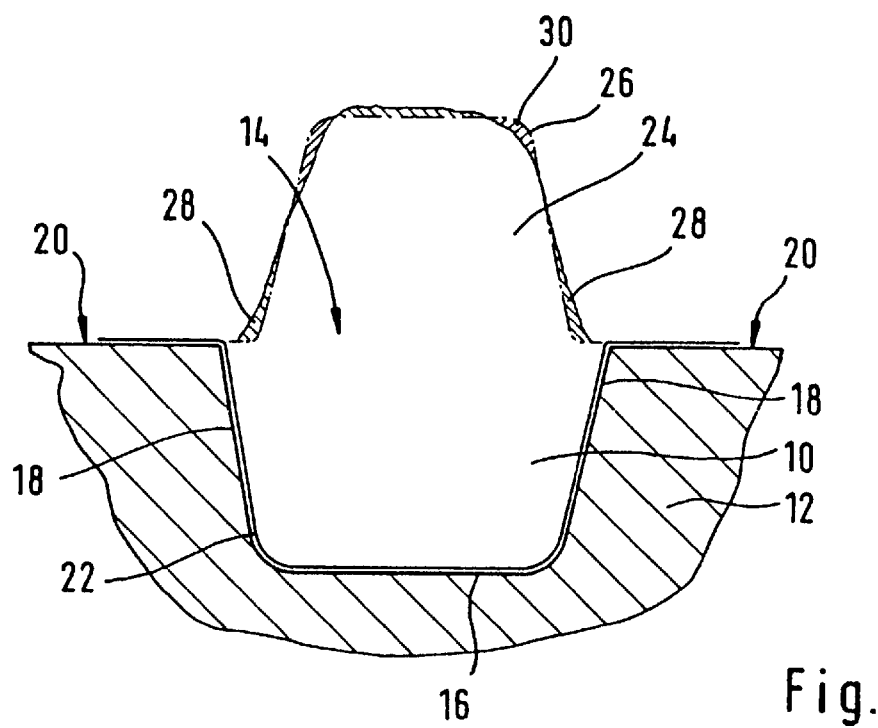
FIG. 1 shows a sectional view of a seal applied to the mold member for use with a first embodiment of the inventive method.

FIG. 1 shows in which manner the inventive seal 10 is applied into the mold member 12. The mold member 12 has a receiving groove 14 which comprises the base 16, groove flanks 18, and lateral surfaces 20 with a non-stick layer 22 extending over all surfaces. The non-stick layer 22 allows for easy removal of the seal from the mold member and is non-adhering relative to the material of the seal 10, for example, a silicone elastomer.

The seal 10 is introduced at room temperature (approximately 20° C.) into the mold member receiving groove 14 whereby excess material 24 projects considerably upwardly past the lateral surfaces 20. The excess material 24 is of such an amount that it completely fills the bearing groove 26 which is indicated by a dashed line in FIG. 1. Accordingly, the sum of surfaces 28 are substantially greater than the surface 30 whereby the ratio of the surfaces relative to one another can be calculated or, expediently, determined empirically.

It is understood that any suitable other shapes of the excess material 24 are possible. It is preferred to allow for a simple manufacture with low pressure application devices, whereby it is understood that the temperature for the preheating is selected such that the sealing material for the seal 10 is sufficiently viscous in order to be introduced completely into the groove 26.

Figure 2:
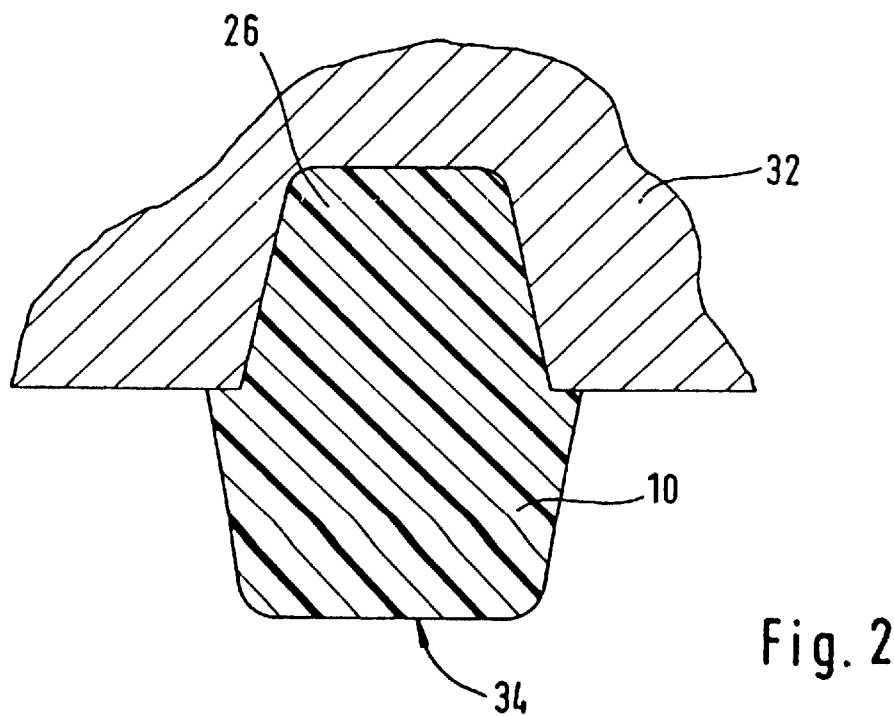
FIG. 2 shows the seal of FIG. 1 after the pressing step between the mold member and the shaped body, the curing step, and removal.

Directly after application of the sealing material (10) into the receiving groove 14, the non-represented heating device is turned on in order to increase the temperature to such an extent that curing begins. At the same time, the shaped body 32 shown in FIG. 2 is then positioned at the mold member 12 and, by applying pressure to these parts, the excess amount of material 24 is deformed such that the seal 10 assumes the required shape in the area of the bearing groove 26. Since the surface 30 is somewhat smaller than the surface 28, the excess sealing material of the seal 10 is forced out laterally. It is not critical whether this material remains at the shaped body 32 since it does not interfere with the actual sealing function. However, it is understood that the material, if required, can be removed with suitable means.

The temperature of the unit comprised of the shaped body 32 and the mold member 12 is maintained at the curing temperature as long as required for curing the seal 10. For example, this takes 1 to 2 minutes. In this context it is favorable for achieving good working cycle times when the heating of the mold member and the shaped body is already started as soon as the sealing material for the seal 10 is brought into the state represented in FIG. 1.

In this context it is favorable when the mold member 12 has a comparatively minimal heat capacity, for example, is a hollow profile, which is supported only in the area of the receiving groove 14 in order to be able to withstand the applied pressure.

In this context it is especially favorable that no high pressure, but only low pressure application is required for manufacturing the seal. Accordingly, the load specifications for the support of the shaped body 32, for example, in the form of a cylinder head, as well as for the mold member 12 are substantially reduced.

Figure 3:
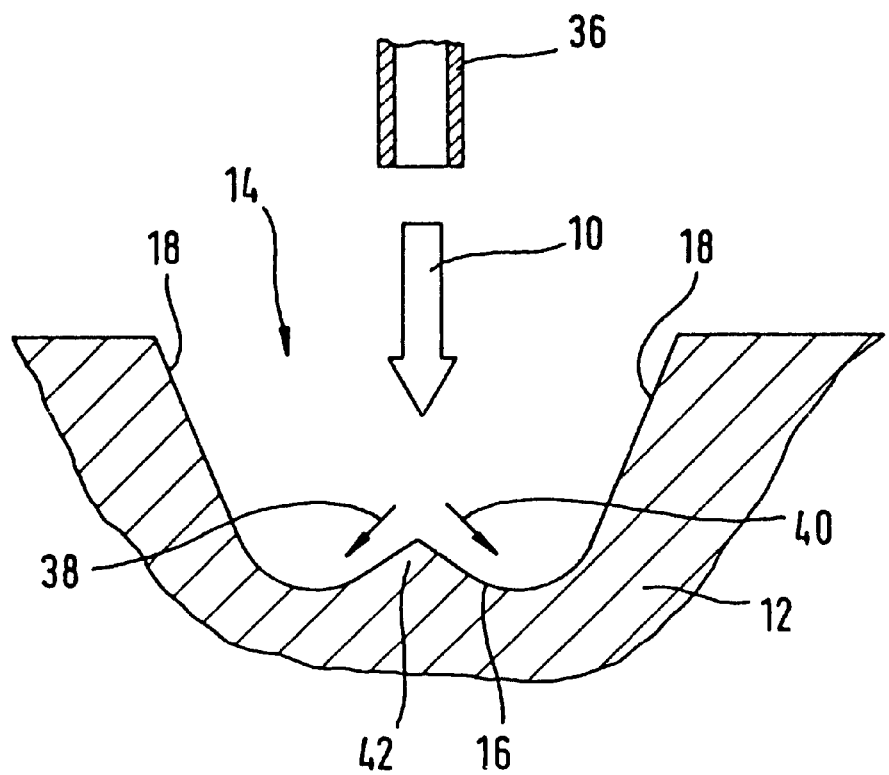
FIG. 3 shows a schematic representation of the application of the sealing material into the receiving groove of the mold member in another embodiment of the invention.
Figure 4:
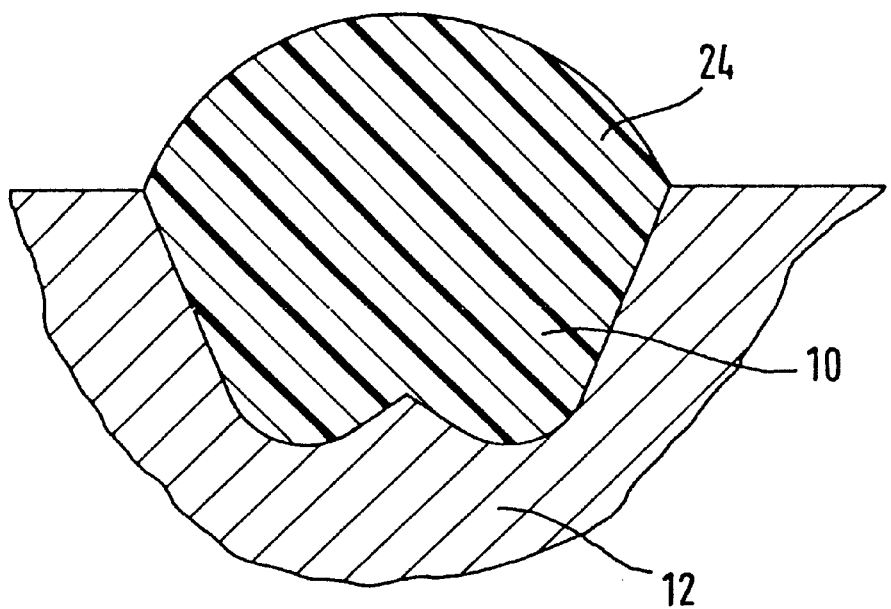
FIG. 4 shows the seal introduced into the receiving groove of the mold member of FIG. 3 before positioning the shaped body.

A further embodiment of the inventive solution is represented in FIGS. 3 and 4. While the shape of the seal 10 according to FIGS. 1 and 2 can be introduced substantially without bubbles, whereby especially the low number of bubbles in the area of the active surface 34 is important, the embodiment according to FIGS. 3 and 4 of the mold member 14 is even more favorable with respect to preventing bubbles at high sealing material application velocities despite the low pressure. The application nozzle 36 as part of a low pressure application device introduces the sealing material for the seal 10 from above into the receiving groove 14. The base 16 of the groove 14 has a special design which achieves an especially favorable flow deflection of the introduced sealing material. As can be seen in connection with the arrows 38, 40 represented in FIG. 3, the sealing material is laterally deflected by the leading tip 42 and flows along the surfaces of the base 16 of the groove 14 and the surfaces of the adjacent flanks 18 in order to fill the entire area of the receiving groove 14. Thus, there results the shape of the seal 10 represented in FIG. 4 before positioning the shaped body 32 on the mold member 12.

It is understood that the application nozzle 36 can be aligned in a suitable manner. In the shown embodiment it is suggested to select an alignment which is perpendicular to the plane of the drawing whereby, if desired, a slant transverse to the plane of the drawing can also be applied in order to facilitate flowing of the viscous sealing material 10 out of the nozzle.

This embodiment is especially suitable for the fast formation of a seal 10 without any bubbles. It is understood that it is inventively especially favorable that, in general, no special protective gas atmosphere must be provided since it is preferred to use a solvent-free sealing material that, for example, can be a two-component sealing material.

Instead of the represented shape of the excess material 24 it is also possible to realize excess material 24 with the application nozzle 36 in a manner known per se such that it is very similar to the desired shape of the bearing groove 26. In this case it is necessary to select a special shape of the nozzle depending on the shape of the bearing groove; however, the required displacement of material is minimal so that, in essence, it is possible to manufacture at a greater speed.

The present invention is, of course, in no way restricted to the specific disclosure of the specification and drawings, but also encompasses any modifications within the scope of the appended claims.

What we claim is:

1. A method of manufacturing a seal at a cylinder head of a vehicle motor, said method comprising the steps of:

providing a bearing groove at the cylinder head;

providing a mold member for cooperating with the bearing groove to form the seal, the mold member having a receiving groove for receiving a sealing material;

introducing the sealing material into the bearing groove of the mold member so as to fill the receiving groove and provide a defined excess of sealing material surpassing the volume of sealing material required for filling the bearing groove and projecting upwardly past lateral surfaces of the mold member;

subsequently positioning the bearing groove at the mold member so as to enclose the sealing material previously introduced in the mold member and the defined excess and applying pressure to the sealing material such that the defined excess is deformed to assume the shape of the receiving groove of the mold member; and curing under pressure the sealing material enclosed in the bearing groove and the receiving groove of the mold member to form the seal.

2. A method according to claim 1, wherein the step of positioning includes pressing the defined excess material, while in a plastically deformable state before the step of curing, into the bearing groove.

3. A method according to claim 1, wherein the step of introducing includes applying pressure of 1.5 to 6 bar on the sealing material during introduction.

4. A method according to claim 3, wherein the pressure is 3 bar.

5. A method according to claim 1, wherein the step of introducing includes applying the sealing material with a low pressure metering and mixing device and wherein the sealing material is a heat-curable two-component silicone elastomer.

6. A method according to claim 1, further including heating the sealing material before introducing same into the mold member.

7. A method according to claim 6, further including heating the cylinder head before introducing the sealing material.

8. A method according to claim 7, further including heating the mold member before introducing the sealing material.

9. A method according to claim 6, further including heating the mold member before introducing the sealing material.

10. A method according to claim 1, further including step on heating the cylinder head before introducing the sealing material.

11. A method according to claim 10, further including heating the mold member before introducing the sealing material.

12. A method according to claim 1, further including heating the mold member before introducing the sealing material.

13. A method according to claim 1, wherein the mold member has a low mass and, is stiffened in an area of the receiving groove.

14. A method according to claim 13, further comprising providing the receiving groove with a non-stick surface layer for facilitating removal of the seal from the mold member.

15. A method according to claim 14, wherein the non-stick surface is made of polytetrafluoroethylene.

16. A method according to claim 1, wherein the sealing material is solvent-free.

17. A method according to claim 16, wherein the sealing material is free of ethyl acetate.

* * * * *